US010664859B2

(12) United States Patent
Bender et al.

(10) Patent No.: US 10,664,859 B2
(45) Date of Patent: May 26, 2020

(54) COGNITIVE EXPANSION OF USER ACCEPTANCE CRITERIA

(71) Applicant: International Business Machines Corporation, Armonk, NY (US)

(72) Inventors: Michael Bender, Rye Brook, NY (US); Edward T. Childress, Austin, TX (US); Rhonda Childress, Austin, TX (US); Michael P. Shute, Niantic, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 757 days.

(21) Appl. No.: 15/152,968

(22) Filed: May 12, 2016

(65) Prior Publication Data
US 2017/0330214 A1 Nov. 16, 2017

(51) Int. Cl.
G06Q 30/02 (2012.01)
G06Q 30/06 (2012.01)
G06Q 50/00 (2012.01)
G06Q 10/08 (2012.01)

(52) U.S. Cl.
CPC ....... G06Q 30/0223 (2013.01); G06Q 10/087 (2013.01); G06Q 30/0283 (2013.01); G06Q 30/0633 (2013.01); G06Q 50/01 (2013.01)

(58) Field of Classification Search
CPC .................................................. G06Q 30/02
See application file for complete search history.

(56) References Cited

U.S. PATENT DOCUMENTS 6,625,503 B1  9/2003  Smith
6,646,659 B1  11/2003  Brown et al.
6,820,062 B1  11/2004  Gupta et al.
(Continued)

FOREIGN PATENT DOCUMENTS

WO    2012118892 A1    2/2012

OTHER PUBLICATIONS

Pu et al., "User-involved preference elicitation for product search and recommender systems." AI magazine 29.4 (2009): 93-103.
(Continued)

Primary Examiner — Vincent M Cao
(74) Attorney, Agent, or Firm — Garg Law Firm, PLLC; Rakesh Garg; James Nock

(57) ABSTRACT

An unexpressed liking and an unexpressed dislike of a user, which are not specified in the user's preference are determined by cognitive analytics. The unexpressed liking and dislike correspond to a first and second characteristic of items, respectively. In a list, a first item having the first characteristic and available in an inventory is included, which is, and a second item having the second characteristic and also available in the inventory is excluded. Items included in the list are arranged according to the user's degrees of liking or the items. An item having the first characteristic is determined to be absent from the inventory. Using completed sales information received from a set of retailer systems, an estimated value of a lost sales opportunity produced when the absent item is purchased is computed. The prioritized list and an accommodation offer responsive to the cost of the lost opportunity are presented.

20 Claims, 4 Drawing Sheets

(56) References Cited

U.S. PATENT DOCUMENTS

| | | | |
|---|---|---|---|
| 7,953,873 B1 | 5/2011 | Madurzak | |
| 8,112,504 B2 | 2/2012 | Logan et al. | |
| 8,126,881 B1* | 2/2012 | Sethi | G06F 17/30536 |
| | | | 707/723 |
| 9,087,364 B1 | 7/2015 | Gluck | |
| 2002/0002502 A1* | 1/2002 | Maes | G06Q 30/02 |
| | | | 705/26.7 |
| 2003/0023483 A1* | 1/2003 | Messner | G06Q 10/0637 |
| | | | 705/14.24 |
| 2005/0060417 A1 | 3/2005 | Rose | |
| 2007/0213948 A1* | 9/2007 | Hornstein | G06Q 30/02 |
| | | | 702/81 |
| 2008/0086359 A1* | 4/2008 | Holton | G06Q 30/02 |
| | | | 705/7.29 |
| 2008/0245863 A1 | 10/2008 | Buchheit | |
| 2008/0294583 A1* | 11/2008 | Hunt | G06Q 20/0855 |
| | | | 706/46 |
| 2010/0017265 A1 | 1/2010 | Weingarten et al. | |
| 2010/0028095 A1 | 2/2010 | Yang et al. | |
| 2010/0169340 A1* | 7/2010 | Kenedy | G06Q 30/02 |
| | | | 707/758 |
| 2012/0253908 A1* | 10/2012 | Ouimet | G06Q 30/02 |
| | | | 705/14.23 |
| 2012/0316934 A1* | 12/2012 | Zier | G06Q 30/02 |
| | | | 705/14.4 |
| 2013/0325640 A1 | 12/2013 | Morgan et al. | |
| 2015/0006303 A1 | 1/2015 | Little | |

OTHER PUBLICATIONS

Urban et al., "Design and evaluation of a trust based advisor on the Internet." Interface (1999).

\* cited by examiner

US 10,664,859 B2

COGNITIVE EXPANSION OF USER ACCEPTANCE CRITERIA

TECHNICAL FIELD

The present invention relates generally to a method, system, and computer program product for determining a user's likes or dislikes related to a requested product or service. More particularly, the present invention relates to a method, system, and computer program product for cognitive expansion of user acceptance criteria.

BACKGROUND

Hereinafter, a "user" is a person who wishes to order, consume, request, purchase, desire, or otherwise select an item. An "item", as used herein, is any product or service that can be offered to a user. A "retailer", as used herein, is any supplier or provider of an item to a user.

Cognitive analytics is the process of analyzing available information or knowledge about a subject-matter domain to create, infer, deduce, or derive new information. Information about a domain can take many forms, including but not limited to knowledge repositories and ontologies. For example, domain-specific information can take the form of a list of preferences, comments, words, phrases, and their equivalents as relate to an item.

Such information can be sourced from any number of data sources, such as the repositories on the devices associated with various users. A user generally selects the form and content of the information.

SUMMARY

The illustrative embodiments provide a method, system, and computer program product. An embodiment includes a method that receives, from a set of users, a corresponding set of preferences. The embodiment determines, by using the set of preferences as input for a cognitive analysis system, an unexpressed liking and an unexpressed dislike of a first user, the first user being associated with a first preference from the set of preferences, wherein the first preference does not specify the unexpressed liking and the unexpressed dislike, and wherein the unexpressed liking corresponds to a first characteristic of items, and wherein the unexpressed dislike corresponds to a second characteristic of items. The embodiment forms a list, using a processor and a memory, by including a first item available in an inventory received from a retailer system, the first item having the first characteristic. The embodiment excludes from the list, a second item available in the inventory, the second item having the second characteristic. The embodiment arranges, to form a prioritized list, a set of items that are included in the list according to a set of corresponding degrees of liking associated with the set of items. The embodiment determines, that an item having the first characteristic is absent from the inventory, the item forming an absent item. The embodiment computes, using the processor and the memory, using a set of completed sales information received from a set of retailer systems, an estimated value of a sales opportunity produced by the absent item when the absent item is purchased, the value of the sales opportunity forming a cost of a lost opportunity. The embodiment causes the retailer system to present the prioritized list and an accommodation offer, the accommodation offer being responsive to the cost of the lost opportunity.

An embodiment includes a computer program product. The computer program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
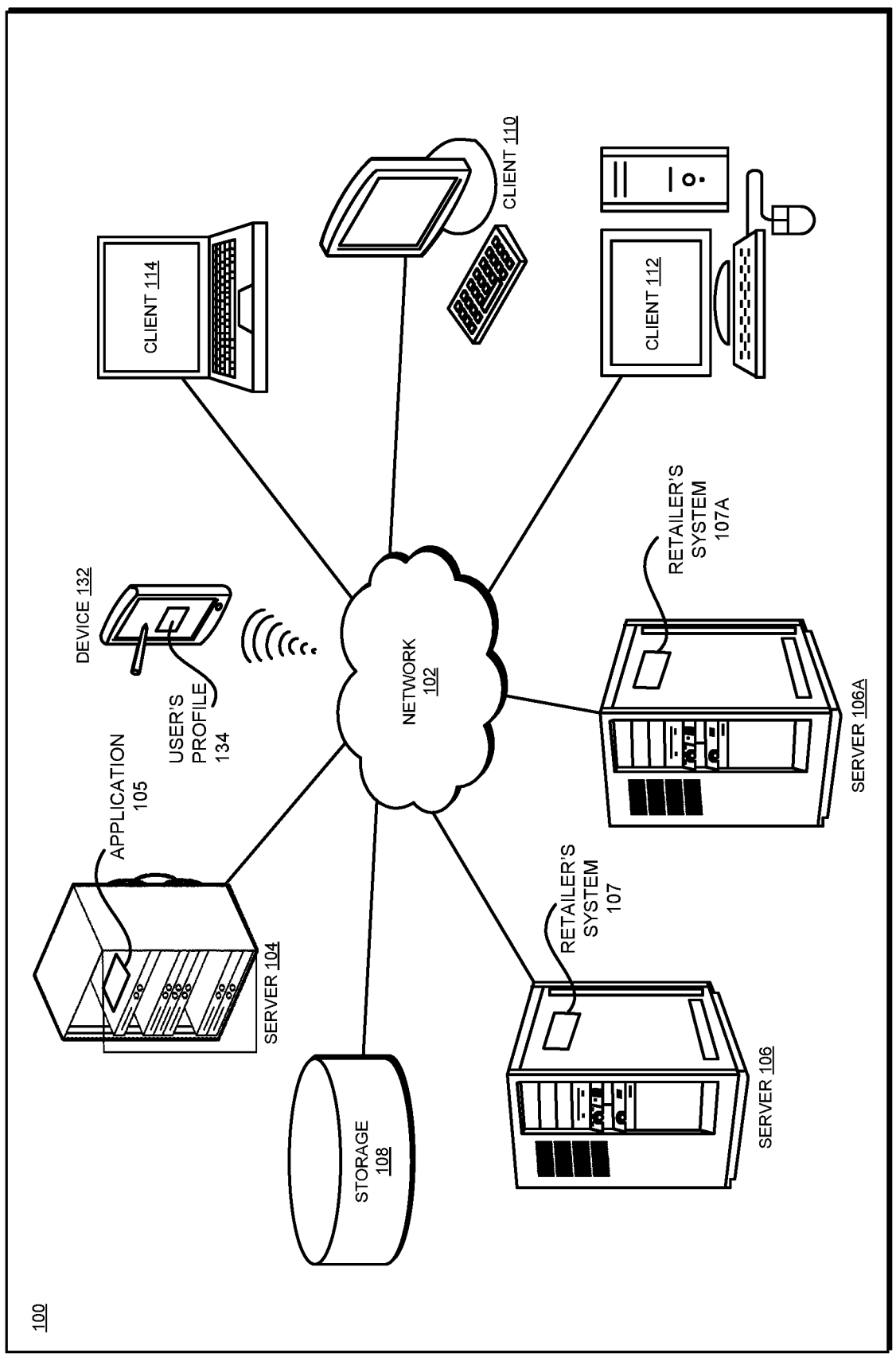
FIG. 1 depicts a block diagram of a network of data processing systems in which illustrative embodiments may be implemented.

Users have preferences, such as a likes and dislikes when it comes to items. Some likes are overt, i.e., the user knows, expresses, or can express, what the user likes or prefers. Similarly, some dislikes are overt, i.e., the user knows, expresses, or can express, what the user does not like or prefer.

The illustrative embodiments recognize that some likes and dislikes of users are covert, implicit, not readily knowable as the overt likes and dislikes. Furthermore, such covert likes and dislikes may be not readily knowable to a retailer, the user's own self, or both. For example, while a user may know that the user likes soup, the user may even know which brand of soup the user prefers to buy, the user may not know whether the user likes or dislikes a store-brand soup or another brand of soup the user has never previously consumed.

The illustrative embodiments recognize that whether a retailer successfully completes a sale of an item to a user depends significantly on the likes and dislikes of the user. Thus, the illustrative embodiments recognize that knowing or learning a user's likes and dislikes—both overt and covert—are extremely important in determining whether the items offered by a retailer to a user will result in a successful sale of the item to the user.

The illustrative embodiments also recognize that often, more than the likes of the user, a dislike of the user is harder to determine than a liking of the user. Often, a loss of sale is driven by a dislike of the user. In many cases, the user knows but the retailer does not know what the user dislikes. In many other cases, the dislike is unknown, at least with a certain degree of certainty, to both the user and the retailer.

A lost sale is a lost opportunity. A lost opportunity includes not just the sale of one item that is unavailable or disliked, but also the sale of other items as a result of losing the sale of the one item.

The illustrative embodiments recognize that quantification of a lost opportunity is a difficult problem. The difficulty in quantifying a lost opportunity arises at least because either the user never communicates to the retailer what sales they lost and for what reason, the retailer has no presently available way of tracking the sales of other items they lost because of losing the sale of one item, or both. For example, if a user prefers one brand of soup, does not find that brand of soup at one retailer, goes to another retailer for that brand of soup, and ends up completing the entire grocery shopping at the other retailer, resulting in the first retailer losing the sale of other items on the user's grocery list as a result of not having the desired brand of soup to offer to the user.

The illustrative embodiments used to describe the invention generally address and solve the above-described problems and other problems related to the selection of items that retailers should offer to users.

An embodiment can be implemented as a software application. The application implementing an embodiment can be configured as a modification of an existing cognitive analysis system, as a separate application that operates in conjunction with an existing cognitive analysis system, a stand-alone application, or some combination thereof.

A set of users participate in a system according to an embodiment, and share their known or overt likes and dislikes with the embodiment. A user in such a set of users shares with the embodiment a set of zero or more likings. A liking can be a general non-item-specific liking—e.g., a general preference for all items made by manufacturer xyz, or a liking specific to an item (e.g., tomato soup), a type of item (e.g., canned soup), or a classification or category of item (e.g., packaged foods). In a similar manner, a user also shares a set of zero or more dislikes, which can also be general, item-specific, item-type specific, classification specific, and so on.

The embodiment analyzes the demands of the user generally, as well as at a given time and/or place. For example, in one circumstance, the embodiment determines the user's general demand, to wit, a desire or need for an overtly or covertly liked item while excluding an overtly or covertly disliked item. A general demand is applicable anytime and at any place regardless of when and where the user might be present at a given time.

A demand can also be specific to a time, place, or both. For example, a demand can be for a brand of soup when the user is present at a grocery store. Generally, within the scope of the illustrative embodiments, a reference to a demand encompasses a general demand and a demand specific to a time and/or place unless expressly disambiguated where user.

To determine the user's demand, the embodiment processes the overtly expresses likes and dislikes of the user and identifies those items whose characteristics match the liked and disliked characteristics. A brand, a color, a vintage, a location of manufacture, a shape, a size, a material, a warranty, a feature of an item are some non-limiting examples of item characteristics. The embodiment retains the items that include a liked characteristic, and omits or excludes the items that includes a disliked characteristic.

The embodiment further determines the user's covert or unexpressed likes and dislikes. In some cases, the user provides hints in other ways that indicate the dislike. For example, a user's shopping pattern may reveal that the user never buys a particular brand of soup even though that brand is readily available where the user shops. Such avoidance is indicative of an inherent dislike that the user has not expressed as a dislike in the profile. As another example, the user returning a particular brand of soup, the user foregoing buying soup when the particular brand of soup is available, the user buying soup only when the particular brand of soup is priced for sale with a significant differential from its regular price, and other behavioral patterns can indicate hidden, latent, or unexpressed dislike. Certain other behavioral patterns can indicate hidden, latent, or unexpressed likings in a similar manner.

The embodiment analyzes other data about the user, e.g., purchase history of the user, user feedback on an item that can be obtained from the user, a retailer, or both. To perform this analysis, the embodiment prepares the data for the analysis, and uses a suitable cognitive analytics methodology to identify covert likings or dislikes of the user.

Through such analysis the embodiment determines a set of covert likes and dislikes of the user. The embodiment then selects the items that include a covertly liked characteristic and satisfies a condition determined from the analysis, and omits or excludes the items that includes a covertly disliked characteristic.

The embodiment performs a substitution analysis. Substitution analysis discovers or reveals a substitute item for a liked item when the liked item is unavailable, a substitute item for a disliked item when the substitute item has a better probability of being liked. To perform the substitution analysis, the embodiment analyzes the likes and dislikes of other participating users. The likes and dislikes of other users are determined in the same manner as described above, and cross-referenced with the likes and dislikes of the user by the embodiment.

When the input include the data of other users, the cognitive analysis system is able to use the other users' likes and dislikes as domain knowledge, and identifies substitution items with associated probabilities of being liked (or disliked) by the user.

In a similar manner, using the profiles and the cognitive analysis system, the embodiment determines not only the overt likes, covert likes, overt dislikes, covert dislikes, and substitution possibilities, the embodiment also determines a prioritization. In other words, the embodiment determines not only which item or a substitute item a user will like (or dislike), but also a priority that the user is likely to associate with the liking or (or dislike) for that item or the substitute item. The embodiment arranges the items or substitutions retained or selected for inclusion according to their respective priorities in a presentation to the user.

The embodiment also uses the output of the analysis, e.g., the overt likes, covert likes, overt dislikes, covert dislikes, and substitution possibilities, and their respective priorities as feedback in a learning loop. For example, through such analysis, the embodiment also identifies one or more conditions under which the user accepts a substitution, likes an item, dislikes an item, expresses a preference for one liked item over another, elects to like an otherwise disliked item, elects to dislike an otherwise liked item, or some combination thereof. For example, one example condition may reveal the tradeoff that a user is willing to make if a substitution is prices lower than a liked item by greater than a threshold differential. Another example condition may reveal that the user may select a substituted item if the distance or time to get a liked item exceeds a threshold distance or time from where or when the user is looking for the item.

As one example, the item with the highest degree of liking is listed highest on the presentation, followed by other items in a decreasing order of their respective degrees of likings. As another example, an item with a greater than threshold degree of liking being unavailable in a given area or period, the likelihood of the user liking a substitute increases, increasing the substitute's position on the list. Accordingly, the position of the substitute improves on the list as a result of an unavailability or another unacceptable factor associated with a liked item.

A retailer maintains a system to track inventory of items that can be offered and sales information about completed sales transactions. For example, a retailer's system includes the various brands of items that are available to the users, and transaction information containing items and quantities purchased by various users.

The embodiment broadcasts the user's profile to the systems of one or more retailers. The broadcasting is particularly useful when the user's location and time of presence can be determined, and a set of retailers applicable to the time and location can be identified. For example, if the user is in London at Piccadilly Circus looking for a hotel room with a preference for a room by the elevator, the broadcasting can be useful in collecting information from those hoteliers who are located at Piccadilly Circus in London.

The embodiment obtains from a retailer's system the inventory that the retailer plans to offer to the user. For example, if the hotel system shows availability for ten different types of rooms, and the profile indicates a liking for a room by the elevator, the hotelier's system may include all ten types of rooms in a message to the embodiment, or may include a shortlist of five types of rooms that the hotelier's system selects for the user based on the user's broadcasted profile.

Once the embodiment receives the inventory information from the retailer's system, the embodiment cross-references the inventory information with the overt likes, covert likes, overt dislikes, covert dislikes, the substitution possibilities, and their prioritization that have been determined as described earlier. The embodiment selects from the received inventory information those items that include a characteristic of a liked item or a substitution item, and excludes those items that include a characteristic of a disliked item.

The embodiment additionally recommends or suggests other liked items or substitution items that the retailer's system should include if available at the retailer. The embodiment returns to the retailer's system a prioritized list of items to present to the user.

From time to time, the retailer's system also provides to the embodiment sales information, e.g., about completed sales transactions. The embodiment receives sales information from a set of retailers in a similar manner. The embodiment analyzes the sales information to determine whether the user bought a liked item from a different retailer. The analysis further determines how much additional sales the user generated at the other retailer when the user bought the liked item there instead of the first retailer. This type of analysis over the sales information from multiple retailers can give important insight into the lost opportunity for the first retailer and quantifies that lost opportunity.

It is possible that a retailer-provided inventory does not include an item that is liked by the user. The lack of a liked item creates a possibility of a lost opportunity during the user's visit at the retailer. Together with the prioritized list of liked and substitute items, with disliked items omitted, the embodiment also provides lost opportunity analysis as a feedback to the retailer. This feedback allows the retailer to either make stocking decisions about the missing item, offer a compensatory promotion or a selective discount, or activate another remedy for the missing liked item for the user.

When a prioritized list is presented to a user, the user generally makes a selection. Implicitly or expressly, the user also chooses not to select some items on the prioritized list. An item that is not selected or deselected is indicative of a preference of the user against the item. The negative preference may be a dislike for the item or item type, or the negative preference may be a lesser degree of liking relative to other items on the list, or may just be a transient or temporary choice against the item.

An embodiment collects selection data generated in response to the prioritized list presentation. For example, when a retailer's system presents the prioritized list of offerings to the user, the retailer's system receives the selection inputs that the user provides. The retailer's system then shares the selections made by the user from the list. The selections inform an embodiment in two ways—positive reinforcement for the selected items and negative reinforcement for the items not selected.

The embodiment supplies the positive reinforcement to the cognitive analysis system as a positive learning example, whereby the cognitive analysis system learns to increase the degree of liking associated with a selected item. In a similar manner, the embodiment supplies the negative reinforcement to the cognitive analysis system as a negative learning example, whereby the cognitive analysis system learns to decrease the degree of liking (or increase the dislike) associated with an item that is not selected.

Over time, the cognitive analysis system learns about the overt and covert likes and dislikes of the user from numerous selections and non-selections that the user makes. If, from numerous prioritized lists that include an item or a substitution, a user consistently chooses not to select the item or a substitution, the cognitive analysis system learns that the user has a degree of dislike towards the item or substitution. Conversely, if, from numerous prioritized lists that include an item or a substitution, a user consistently chooses to select the item or a substitution, the cognitive analysis system learns that the user has a degree of liking towards the item or substitution. Occasional selection (or non-selection) of the item or substitution do not significantly change the system's learned liking or dislike corresponding to the item or substitution.

When an embodiment presents the prioritized list of offerings to the user, the embodiment receives the selection inputs directly from the user without relying on a retailer's system. The embodiment uses the positive and negative reinforcements from the directly received selections in a similar manner.

A method of an embodiment described herein, when implemented to execute on a device or data processing system, comprises substantial advancement of the functionality of that device or data processing system in better customizing item offerings to a user. For example, presently available methods for presenting items to a user depend largely on the retailer's own information that the retailer has collected about the user from previous transactions with the user. Such a narrow view of the user's likes fails to reveal the covert likes of the user, the overt and covert dislikes of the user, possible substitutions that would correspond to the overt and covert likes of the user, lost opportunity quantification, or a combination thereof. An embodiment uses a cognitive analysis system to identify overt and covert likes and dislikes of a user, substitution possibilities based on the information obtained from other users and other retailers. The embodiment further provides a suggested prioritized list of items from a retailer's inventory that are likely to interest the user while also taking into account the dislikes of the user. The embodiment also informs the retailer about any lost opportunity cost associated with a liked item that is missing in the retailer's inventory. This manner of cognitive expansion of user acceptance criteria is unavailable in the presently available methods. Thus, a substantial advancement of such devices or data processing systems by executing a method of an embodiment is in improving the sales to and customer satisfaction of a user, improving a user's experience by avoiding the presentation of disliked items, while also enabling decision making about missing inventory items based on an informed estimate of the lost opportunity costs.

The illustrative embodiments are described with respect to certain types of items, retailers, likes, dislikes, profiles, preferences, substitutions, quantification, analyses, prioritization, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
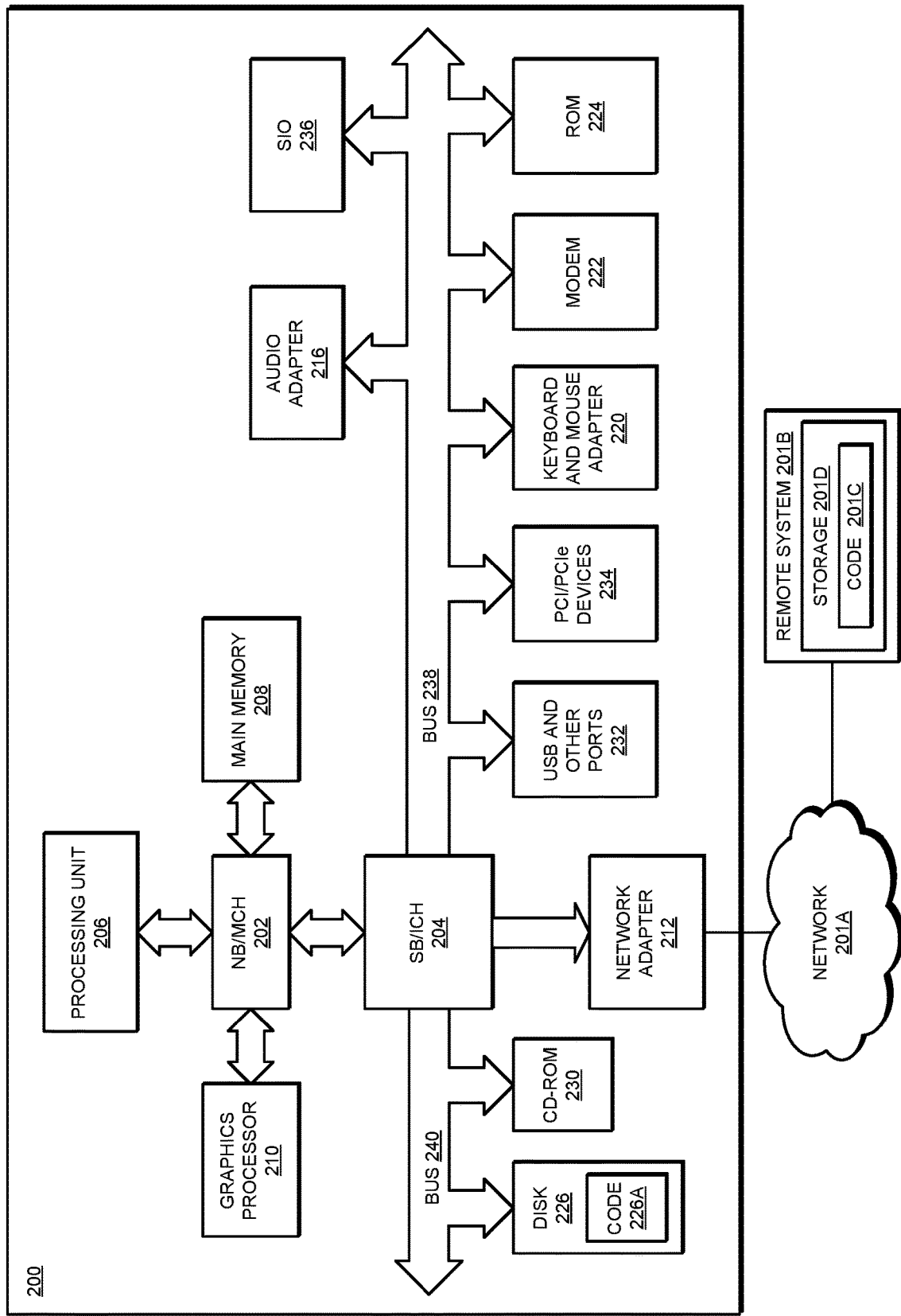
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Device 132 is associated with a user, and stores user profile 134 as described herein. Any number of users with similarly configured devices of various types can participate with application 105 a manner described herein. Application 105 interacts with a set of retailer systems, e.g., system 107 in server 106 of retailer m through system 107A in server 106A of retailer n.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
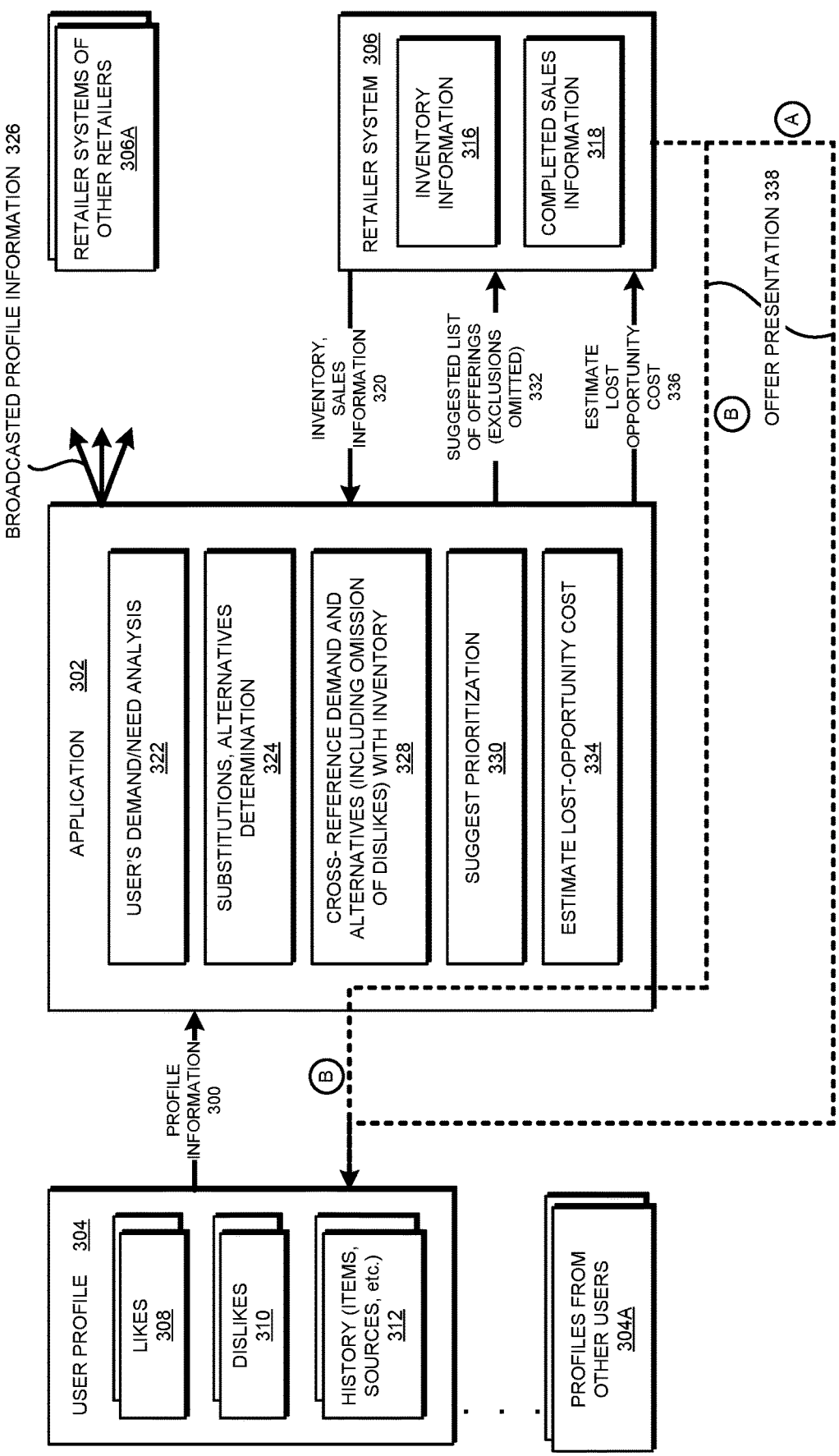
FIG. 3 depicts a block diagram of an example configuration for cognitive expansion of user acceptance criteria in accordance with an illustrative embodiment.

With reference to FIG. 3, this figure depicts a block diagram of an example configuration for cognitive expansion of user acceptance criteria in accordance with an illustrative embodiment. Application 302 is an example of application 105 in FIG. 1. User profile 304 is an example of user profile 134 in FIG. 1. Profiles 304A are any number of profiles associated with other users, and configured in the manner of profile 304 to interact with application 302. Retailer system 306 is an example of retailer system 107 in FIG. 1. Retailer systems 306A are any number of systems associated with other retailers and configured in the manner of system 306 to interact with application 302.

Profile 304 includes set 308 of likes. A like in set 308 is an overt like expressed and shared by the user. Profile 304 includes set 310 of dislikes. A dislike in set 310 is an overt dislike expressed and shared by the user. History 312 includes purchased items, source or retailer from where those items were purchased, user-provided comments about those items, returned items, or some combination of these and other similarly purposed pieces of information.

The contents of profile 304 can be arranged in any manner suitable to a particular implementation. Different profiles 304 and 304A can have different arrangements and formats of similar contents. Contents of profile 304 are shared with application 302 in the form of profile information 314.

Retailer system 306 includes inventory information 316, which includes description and characteristics of the items that can be presented to a user by the retailer of system 306. Completed sales information 318 is data describing sales transactions completed with a set of users, including with the user of profile 304, if any. System 306 shares the inventory information and sales information with application 302 in the form of shared information 320.

Other systems 306A also include inventory information and sales information for other corresponding retailers. Other systems 306A similarly share their information with application 302.

Component 322 analyzes profile 304 to determine a demand of the associated user. Component 322 uses a cognitive analysis system (not shown) to perform the analysis.

The demand determined by component 322 can be a general demand or a location and/or time specific demand. For example, when the location and/or time of presence of the user at a particular place or retailer is available as input (not shown) to application 302, component 322 can determine a specific demand.

Using a cognitive analysis system (not shown), profile 304, and other profiles 304A, component 324 determines possible substitutions according to the liked items determined during the demand analysis.

Application 302 broadcasts (326) profile information 314 to system 306 and optionally to other systems 306A. In one case, broadcast 326 occurs to system 306 when the user of profile 304 is within a predefined distance of the retailer of system 306, at a predetermined time, or some combination thereof. In another case, broadcast 326 occurs to system 306 and systems 306A from time to time. In another case, broadcast 326 occurs when the user of profile 304 is interacting with the retailer of system 306, some other retailer associated with a system in systems 306A, or some combination thereof.

Responsive to broadcast 326, from time to time, at some predetermined time or interval, or some combination one or more of these factors, system 306 sends information 320 to application 302. For example, when information 320 is responsive to broadcast 326, information 320 includes the items which system 306 selects to offer to the user of profile 304. As described herein, such items may be all or a subset of items in the inventory of the retailer according to inventory information 316.

Using information 320, component 328 cross-references the demand and substitutions computed by components 322 and 324, respectively, with the items listed in information 320. As an example, component 328 may exclude from a list an item received in information 320 if a characteristic of the item matches a disliked characteristic. As another example, component 328 may include in the list an item received in information 320 if a characteristic of the item matches a liked characteristic or a characteristic of a selected substitution item.

Component 330 prioritizes the list of the included items according to the respective degrees to which their characteristics are liked by the user of profile 304. Component 330 outputs prioritized list 332, which omits the exclusions. Application 302 sends prioritized list 332 to system 306.

As described herein, if a lost opportunity is identified, e.g., when the inventory according to information 320 fails to include a liked item, component 334 computes a lost opportunity cost. Application 302 sends estimated lost opportunity cost 336 to system 306 as well.

Application 302 causes system 306 to present an offering of items to the user of profile 304. Specifically, by sending prioritized list 332 and optionally estimate of lost opportunity cost 336 to system 306, application 302 enables system 306 to prepare offer presentation 338. System 306 can send offer presentation 338 to the user of profile 304 directly, e.g., via path A. Alternatively, system 306 can send offer presentation 338 to application 302 and a component (not shown) of application 302 sends offer presentation 338 to the user, e.g., via path B. In path B, application 302 can combine other offer presentations (not shown) from other retailers together with offer presentation 338, to present to the user of profile 304.

Figure 4:
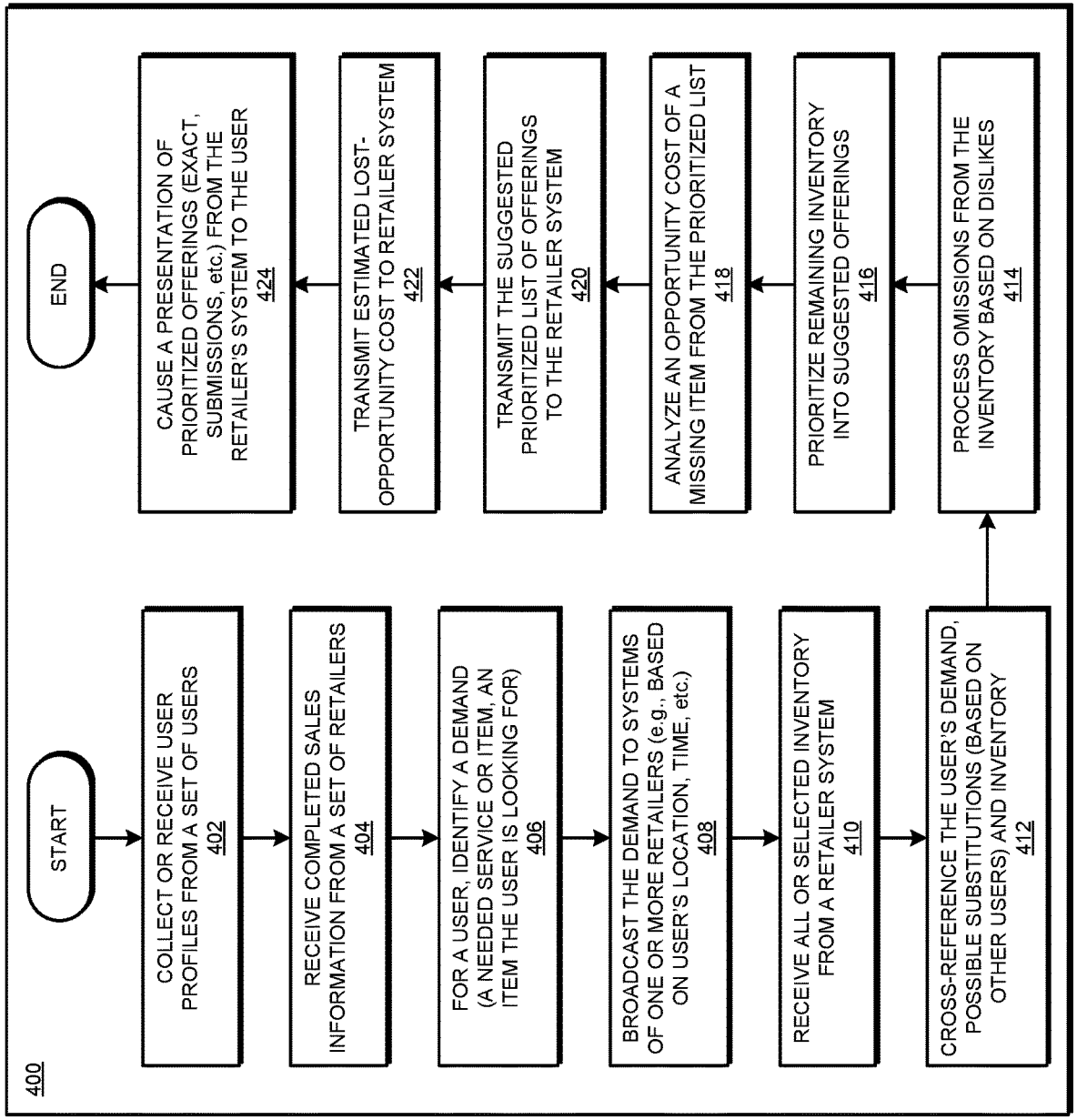
FIG. 4 depicts a flowchart of an example process for cognitive expansion of user acceptance criteria in accordance with an illustrative embodiment.

With reference to FIG. 4, this figure depicts a flowchart of an example process for cognitive expansion of user acceptance criteria in accordance with an illustrative embodiment. Process 400 can be implemented in application 302 in FIG. 3.

The application collects or receives a set of user profiles from a set of users (block 402). The application receives information of completed sales from a set of retailers (block 404).

For a user, the application identifies a demand (block 406). The demand can be for a liked item, which may be needed by the user, or which the user may be looking for. The demand is determined using a cognitive analysis system, and includes not only overtly or covertly liked items but also substitutions that are possible given the likings of the user.

The application broadcasts the demand to the systems of one or more retailers (block 408). In some cases, the broadcast may be to certain systems selected based on the user's location, time of broadcast, or some combination of these and other considerations.

The application receives inventory information of all or a subset of inventory from a retailer system that receives the broadcast (block 410). The application cross-references the demand determined in block 406 with the received inventory information (block 412). The application processes omission of dislikes, i.e., removes or omits the items with disliked characteristics, from the inventory information (block 414).

The items remaining from the inventory information have a liked characteristic either for a liked item or a substitution. The application arranges the remaining items in a prioritized order, e.g., in a decreasing order of the degrees of liking associated with the items (block 416). As described herein, the degree of liking can also be determined using the cognitive analysis system.

If a liked item, or a liked characteristic is missing from the inventory information, the application also analyzes a lost opportunity cost associated with that missing liked item or characteristic (block 418). The application transmits the suggested prioritized list of offerings from block 416 to the retailer system that provided the inventory information in block 410 (block 420). When computed, the application also provides to the retailer's system the lost opportunity cost estimate for the missing item or characteristic (block 422).

The application causes the retailer's system to make an offering presentation to the user according to the suggested prioritized list (block 424). The application ends process 400 thereafter.

Thus, a computer implemented method, system or apparatus, and computer program product are provided in the illustrative embodiments for cognitive expansion of user acceptance criteria and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
receiving, from a set of users, a corresponding set of preferences;
determining, by analyzing a shopping pattern of a first user using a cognitive analysis system, an unexpressed liking and an unexpressed dislike of the first user, the first user being associated with a first preference from the set of preferences, wherein the first preference does not specify the unexpressed liking and the unexpressed dislike, and wherein the unexpressed liking corresponds to a first characteristic of items, and wherein the unexpressed dislike corresponds to a second characteristic of items;
forming a list, using a processor and a memory, by including a first item available in an inventory received from a retailer system, the first item having the first characteristic;
excluding from the list, a second item available in the inventory, the second item having the second characteristic;
arranging, to form a prioritized list, a set of items that are included in the list according to a set of corresponding degrees of liking associated with the set of items, wherein an item among the set of items with a greater degree of liking than other items is listed first on the prioritized list with a remaining set of items listed in a decreasing order of liking;
determining, that an item having the first characteristic is absent from the inventory in response to a broadcast of a profile of the first user, the broadcast including a time and location of the first user, the item forming an absent item;
determining, using the unexpressed liking and the unexpressed dislike of the first user, a condition under which the first user accepts a substitution for the absent item, the condition comprising a price difference for the substitution being greater than a threshold price difference;
computing, using the processor and the memory, using a set of completed sales information received from a set of retailer systems, an estimated value of a sales opportunity produced by the absent item when the absent item is purchased the value of the sales opportunity forming a cost of a lost opportunity;
causing the retailer system to present the prioritized list and an accommodation offer, the accommodation offer being responsive to the cost of the lost opportunity and the broadcasted profile; and
modifying, responsive to receiving a response to the accommodation offer, the unexpressed liking, the unexpressed dislike and the condition.

2. The method of claim 1, wherein the value of the sales opportunity includes a value of the absent item and a value of another item purchased with the absent item.

3. The method of claim 1, further comprising:
including in the list a third item, the third item having a third characteristic that is substitutable for the first characteristic.

4. The method of claim 3, further comprising:
determining the third characteristic from an answer provided by the cognitive analysis system using based on the set of profiles.

5. The method of claim 3, further comprising:
determining, using the cognitive analysis system, a condition under which the third item is acceptable as a substitute for the first item, the third item satisfying the condition in addition to having the first characteristic, and wherein the condition is a factor of one of (i) a price differential between the first item and the third item, (ii) a distance between a first location of availability of the first item and a second distance of availability of the third item, and (iii) a period between a first time of availability of the first item and a second time of availability of the third item.

6. The method of claim 1, further comprising:
determining, for an item included in the list, a degree of liking by analyzing in the cognitive analysis system the set of profiles.

7. The method of claim 1, further comprising:
receiving information about the inventory from the retailer system, responsive to transmitting to the retailer system the first preference and the unexpressed liking, wherein the inventory information comprises a subset of all items available for offering in the retailer system.

8. The method of claim 1, wherein a preference of a user includes a set of expressed liked characteristics and a set of expressed disliked characteristics.

9. The method of claim 1, further comprising:
receiving, responsive to presenting the prioritized list, a selection input, the selection input selecting the first item;
increasing, in the cognitive analysis system, a degree of liking associated with the first item for the first user;
determining, from the selection input, that a substitution item offered as a result of the accommodation offer is not selected; and
decreasing, in the cognitive analysis system, a degree of liking associated with the substitution item for the first user.

10. The method of claim 9, further comprising:
receiving from the retailer system, the selection input, wherein the retailer's system receives the selection input from the first user.

11. The method of claim 1, wherein the method is embodied in a computer program product comprising one or more computer-readable storage devices and computer-readable program instructions which are stored on the one or more computer-readable tangible storage devices and executed by one or more processors.

12. The method of claim 1, wherein the method is embodied in a computer system comprising one or more processors, one or more computer-readable memories, one or more computer-readable storage devices and program instructions which are stored on the one or more computer-readable storage devices for execution by the one or more processors via the one or more memories and executed by the one or more processors.

13. A computer usable program product comprising one or more computer-readable storage devices, and program instructions stored on at least one of the one or more storage devices, the stored program instructions comprising:
program instructions to receive, from a set of users, a corresponding set of preferences;
program instructions to determine, by analyzing a shopping pattern of a first user using a cognitive analysis system, an unexpressed liking and an unexpressed dislike of the first user, the first user being associated with a first preference from the set of preferences, wherein the first preference does not specify the unexpressed liking and the unexpressed dislike, and wherein the unexpressed liking corresponds to a first characteristic of items, and wherein the unexpressed dislike corresponds to a second characteristic of items;
program instructions to form a list, using a processor and a memory, by including a first item available in an inventory received from a retailer system, the first item having the first characteristic;
program instructions to exclude from the list, a second item available in the inventory, the second item having the second characteristic;
program instructions to arrange, to form a prioritized list, a set of items that are included in the list according to a set of corresponding degrees of liking associated with the set of items, wherein an item among the set of items with a greater degree of liking than other items is listed first on the prioritized list with a remaining set of items listed in a decreasing order of liking;
program instructions to determine, that an item having the first characteristic is absent from the inventory in response to a broadcast of a profile of the first user, the broadcast including a time and location of the first user, the item forming an absent item;
program instructions to determine, using the unexpressed liking and the unexpressed dislike of the first user, a condition under which the first user accepts a substitution for the absent item, the condition comprising a price difference for the substitution being greater than a threshold price difference;
program instructions to compute, using the processor and the memory, using a set of completed sales information received from a set of retailer systems, an estimated value of a sales opportunity produced by the absent item when the absent item is purchased, the value of the sales opportunity forming a cost of a lost opportunity;
program instructions to cause the retailer system to present the prioritized list and an accommodation offer, the accommodation offer being responsive to the cost of the lost opportunity and the broadcasted profile; and
program instructions to modify, responsive to receiving a response to the accommodation offer, the unexpressed liking, the unexpressed dislike and the condition.

14. The computer usable program product of claim 13, wherein the value of the sales opportunity includes a value of the absent item and a value of another item purchased with the absent item.

15. The computer usable program product of claim 13, further comprising:
program instructions to include in the list a third item, the third item having a third characteristic that is substitutable for the first characteristic.

16. The computer usable program product of claim 15, further comprising:
program instructions to determine the third characteristic from an answer provided by the cognitive analysis system using based on the set of profiles.

17. The computer usable program product of claim 13, further comprising:
program instructions to determine, for an item included in the list, a degree of liking by analyzing in the cognitive analysis system the set of profiles.

18. The computer usable program product of claim 13, further comprising:
program instructions to receive information about the inventory from the retailer system, responsive to transmitting to the retailer system the first preference and the unexpressed liking, wherein the inventory information comprises a subset of all items available for offering in the retailer system.

19. The computer usable program product of claim 13, wherein a preference of a user includes a set of expressed liked characteristics and a set of expressed disliked characteristics.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to receive, from a set of users, a corresponding set of preferences;

program instructions to determine, by analyzing a shopping pattern of a first user using a cognitive analysis system, an unexpressed liking and an unexpressed dislike of the first user, the first user being associated with a first preference from the set of preferences, wherein the first preference does not specify the unexpressed liking and the unexpressed dislike, and wherein the unexpressed liking corresponds to a first characteristic of items, and wherein the unexpressed dislike corresponds to a second characteristic of items;

program instructions to form a list, using a processor and a memory, by including a first item available in an inventory received from a retailer system, the first item having the first characteristic;

program instructions to exclude from the list, a second item available in the inventory, the second item having the second characteristic;

program instructions to arrange, to form a prioritized list, a set of items that are included in the list according to a set of corresponding degrees of liking associated with the set of items, wherein an item among the set of items with a greater degree of liking than other items is listed first on the prioritized list with a remaining set of items listed in a decreasing order of liking;

program instructions to determine, that an item having the first characteristic is absent from the inventory in response to a broadcast of a profile of the first user, the broadcast including a time and location of the first user, the item forming an absent item;

program instructions to determine, using the unexpressed liking and the unexpressed dislike of the first user, a condition under which the first user accepts a substitution for the absent item, the condition comprising a price difference for the substitution being greater than a threshold price difference;

program instructions to compute, using the processor and the memory, using a set of completed sales information received from a set of retailer systems, an estimated value of a sales opportunity produced by the absent item when the absent item is purchased, the value of the sales opportunity forming a cost of a lost opportunity;

program instructions to cause the retailer system to present the prioritized list and an accommodation offer, the accommodation offer being responsive to the cost of the lost opportunity and the broadcasted profile; and program instructions to modify, responsive to receiving a response to the accommodation offer, the unexpressed liking, the unexpressed dislike and the condition.

* * * * *